United States Patent
Dunne (10) Patent No.: US 6,363,558 B1
(45) Date of Patent: Apr. 2, 2002

(54) INFANT SUPPORT WITH AN IMPROVED SECUREMENT DEVICE

(75) Inventor: Debra L. Dunne, Trabuco Canyon, CA (US)

(73) Assignee: Noel Joanna, Inc., Huntington Beach, CA (US)

( * ) Notice: Subject to any disclaimer, the term of this patent is extended or adjusted under 35 U.S.C. 154(b) by 0 days.

(21) Appl. No.: 09/553,699

(22) Filed: Apr. 20, 2000

(51) Int. Cl.$^7$ ............................................. A47D 15/00
(52) U.S. Cl. .......................... 5/655; 5/632; 297/219.12; 297/397
(58) Field of Search ........................... 5/655, 632, 922, 5/636; 297/219.12, 397, 250.1

(56) References Cited

U.S. PATENT DOCUMENTS

| | | |
|---|---|---|
| 3,995,335 A | 12/1976 | Neely |
| 4,779,930 A | 10/1988 | Rosen |
| 5,103,514 A | 4/1992 | Leach |
| 5,228,745 A | 7/1993 | Hazel |
| 5,486,037 A | 1/1996 | Harper |
| 5,586,351 A | * 12/1996 | Ive ................................ 5/655 |
| 5,699,569 A | 12/1997 | Schwarz-Zöhrer |
| 5,735,576 A | 4/1998 | Pepys et al. |
| 5,979,981 A | * 11/1999 | Dunne et al. .......... 297/219.12 |
| 6,036,263 A | * 3/2000 | Gold ..................... 297/219.12 |
| 6,055,686 A | * 5/2000 | Knight ........................... 5/655 |

OTHER PUBLICATIONS

Catalogue description of Century Products® 3000STE Classic with Room–To–Grow Shield, babyfurniture.com/pages/4331TTO.html, printed Apr. 9, 1999.
Catalogue description of evenflo® On My Way Rear Facing Infant Car Seat/Carrier/Rocer With Autobase, babyfurniture.com/pages/207C5.html, printed Apr. 9, 1999.
Catalogue description of Century Products® SmartFit Plus Infant Car Seat, babyfurniture.com/pages/4529ARB.html, printed Apr. 9, 1999.
Catalogue description of Komfy Ride® Facilitating the discharge of low birth weight infants, komfykids.com/prod_info.html, printed Apr. 9, 1999.
Catalogue description of DEX Products® Comfy Seat Deluxe Cushion and Head Support, dexproducts.com/Pages/ComfySeat.html, printed Apr. 2, 1999.
Catalogue description of Baby Best Buy® Safety Accessories for bay, babybestbuy.com/baby_safety.htm, printed Apr. 2, 1999.
Catalogue description of CITIKIDS® Pillows and Supports BASIC COMFORT Adjustable Head Support, citikids.com/adjheadsupp.html, printed Apr. 2, 1999.

* cited by examiner

*Primary Examiner*—Lynne H. Browne
*Assistant Examiner*—Fredrick Conley
(74) *Attorney, Agent, or Firm*—Knobbe, Martens, Olson & Bear LLP (57) ABSTRACT

An infant head support which fits within an infant carrier, swing, stroller, or car seat, prevents the infant's head from falling to one side and protects the infant from injury during transport. The infant head support includes a main body portion and a head cushion element extending around a portion of the body portion. The body portion includes two panels which cooperate to facilitate securement of the support within the infant carrier or other device having shoulder restraint straps. The two panels, which are releasably coupled to one another, detach to form a wide opening for receiving simultaneously the shoulder restraint straps, including a V- or Y-joint. The panels can be re-attached to one another after the shoulder restraint straps have been threaded through the support, thereby separating the straps from one another and guiding the straps over the infant's shoulders.

10 Claims, 7 Drawing Sheets

(PRIOR ART)

INFANT SUPPORT WITH AN IMPROVED SECUREMENT DEVICE

BACKGROUND OF THE INVENTION

1. Field of the Invention

The invention relates generally to protective supports for infants or toddlers, and more particularly, to a head and neck support that can be easily secured to a typical seating device for infants or toddlers, such as a car seat, stroller, swing, infant carrier, etc.

2. Description of the Related Art

Infants require head and body support when they are seated in either a reclining or substantially upright position. Because infants do not have fully developed neck muscles, such support is necessary to prevent their heads from rolling to one side. In addition, when the support is used in a situation where the infant is being moved, the support helps to cushion the infant's head and neck to protect against any injury that can result from jolting movements during transport.

The prior art contains a variety of head and neck supports for infants. A typical prior art device has the shape of an inverted U-shaped roll attached to a back panel. Generally, these supports are used in conjunction with an infant carrier, transport or entertainment device, such as a car seat, stroller, or swing. These devices frequently contain fastening means, such as seat belts, which secure the infant to the device. When the head support is used in conjunction with such a device, the support must be designed in a way that permits the fastening means to continue to secure the infant to the carrier device, even when the added support is present.

In most carrier devices, the fastening means is generally shaped in a Y-configuration. Straps extend over each shoulder of the child and are attached or drawn together at a buckle located generally at the chest or navel level of the child's body. In some instances, an additional crotch strap extends between the child's legs. A fastener portion at the end of this strap can then be coupled to a mating fastener portion of the shoulder harness. In other instances, the shoulder straps converge at the location of a fastener portion and extend downward to mate with a fastener positioned near the edge of the infant seat.

Figure 1:
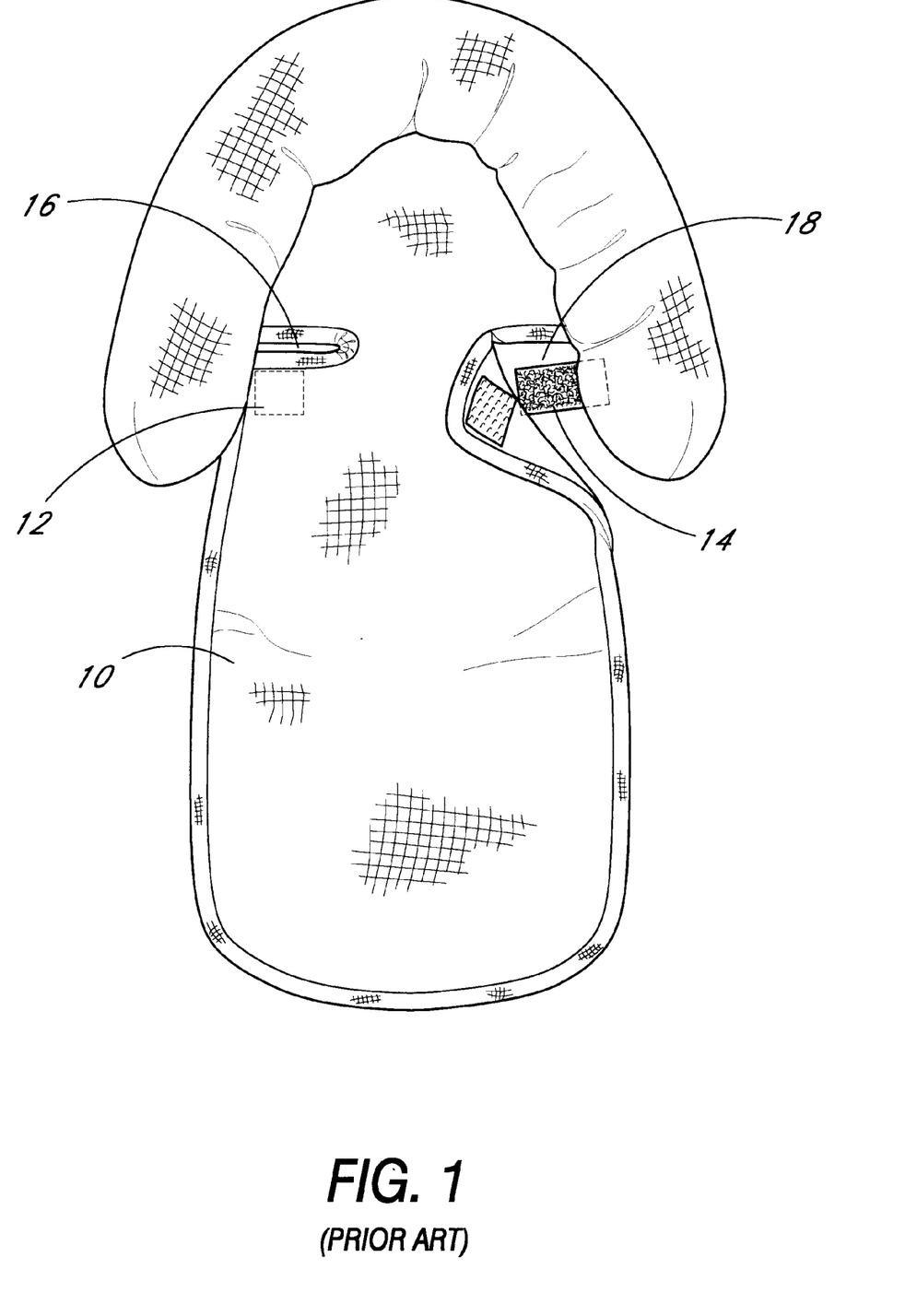
FIG. 1 is a front elevational view of a prior art infant support device.
Figure 2:
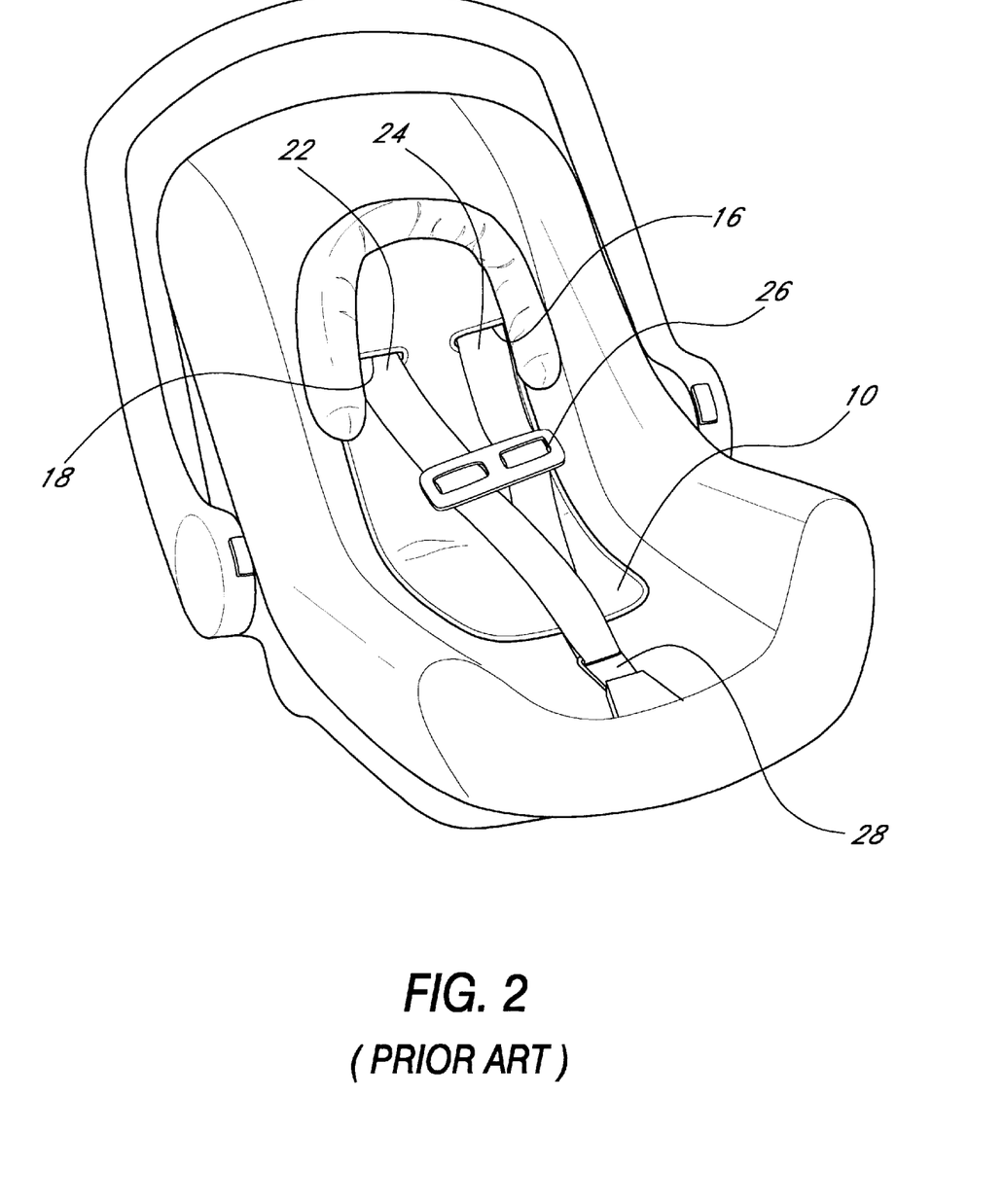
FIG. 2 illustrates the infant support device of FIG. 1 positioned within a typical infant carrier device.
Figure 3:
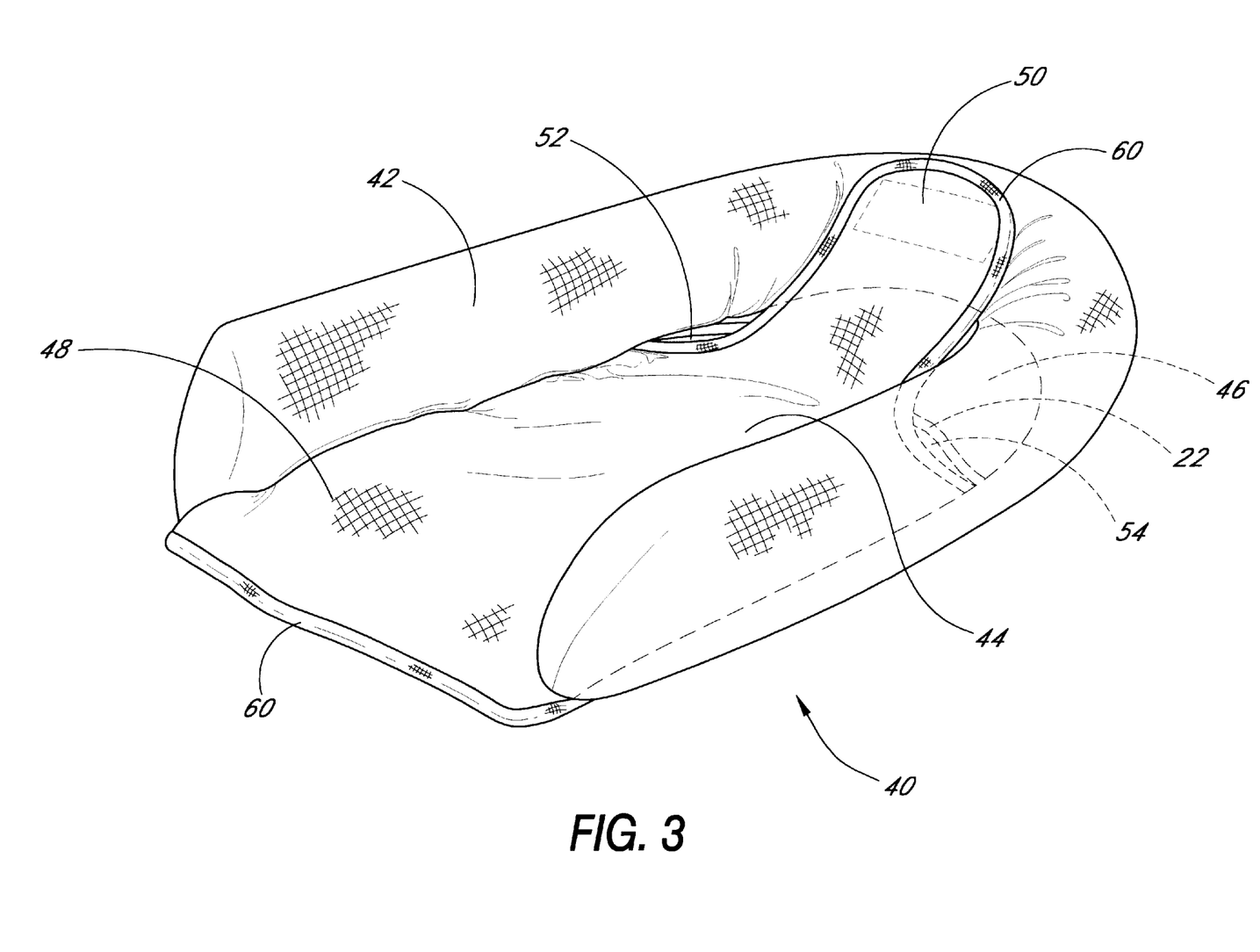
FIG. 3 is a front, right and bottom perspective view of an infant support in accordance with a preferred embodiment of the present invention, showing an open divider flap.

Many prior art head and neck supports, such as the one shown in FIG. 1, require the user to unfasten each shoulder harness strap 22, 24 of the infant carrier, such as the one shown in FIG. 2, in order to position the support within the carrier. For instance, in the infant carrier shown in FIG. 2, the restraining device for securing a child within the carrier includes shoulder harness straps 22, 24 threaded through a buckle 26 and attached to a fastener 28 near the crotch of the child. The buckle 26 couples the shoulder harness straps 22, 24 to one another near the center of the child's body.

In order to secure the body support to the infant carrier, a main body panel 10 is inserted through the shoulder harness straps 22, 24. Tabs 12, 14 (FIG. 1) are disengaged from the back portion of the main body panel 10 in order to allow each shoulder harness strap 22, 24 to be inserted into openings 16, 18 of the body support. After each shoulder harness strap 22, 24 is fitted within openings 16, 18, tabs 12, 14 (FIG. 1) are then coupled to the back portion of the main body panel 10 to secure the body support to the carrier device.

SUMMARY OF THE INVENTION

The present invention provides for easy securement of a body support for infants or toddlers to a transport, carrier or entertainment device, such as a car seat or swing. An infant body support includes an inverted U-shaped roll attached to or integral with a body section of the support, which has an upper panel and a lower panel. An elongated piece or tab extends from the lower panel of the main body section and releasably engages the upper panel. When the elongated tab is coupled to the upper panel, two openings, each sized to accommodate a strap of a shoulder harness or seat belt, are formed. When the elongated tab is uncoupled from the upper panel, one large opening is provided through which a shoulder harness (formed in a V-configuration) or other fastening means can be easily threaded.

BRIEF DESCRIPTION OF THE DRAWINGS

These and other features of the invention will now be described with reference to the drawings of one embodiment of the present infant support device with an adjustable back, which are intended to illustrate, but not to limit the invention. The drawings contain the following figures.

DETAILED DESCRIPTION OF THE PREFERRED EMBODIMENTS

FIGS. 3–7 illustrate an infant support 40 configured in accordance with a preferred embodiment of the present invention. The infant support 40 generally comprises an inverted U-shaped roll or cushion element 42 extending around a body portion 44. The infant support 40 is preferably made of soft, pliable materials, such as fabric made of cotton, polyester or a cotton/polyester blend. The skilled artisan will readily appreciate, however, that various fabrics can be utilized without departing from the spirit and scope of the present invention.

The body portion 44 includes an upper section or panel 46 and a lower section or panel 48. In the illustrated embodiment, each panel 46, 48 is made from two pieces of fabric material. In a preferred embodiment, the front piece of fabric is made of polycotton terrycloth material. A suitable padding fill material, such as polyester foam is located between the front and back pieces of material and the two pieces of material are coupled or joined together by a perimeter binding material 60 sewn around the edges of the two pieces. The skilled artisan will readily appreciate that a variety of suitable fabrics and filler materials can be substituted for the preferred materials noted herein.

The lower panel 48 includes an elongated tab, flap or extension portion 50 which extends towards the upper panel 46. As shown, the flap 50 is narrower than the remaining portions of the upper panel 46. The flap 50 overlaps the upper panel 46 and preferably releasably engages the upper panel 46. It will be understood, in view of the disclosure herein, that a flap can alternatively extend downwardly from the upper panel to overlap the lower panel.

The flap 50 and upper panel 46 preferably have complementary fasteners 56, 58 which cooperate with one another to secure the flap 50 to the upper panel 46. The fasteners are located along the backside of the flap 50 and the frontside of the upper panel 46, although it will be understood that the flap could instead be fastened behind the upper panel. In the illustrated embodiment, the fasteners comprise hook and loop material, such as Velcro™, with loop material 56 located on the flap 50 while hook material 58 is located on the panel 46, though this arrangement can be readily reversed. Other fasteners, such as those known to one skilled in the art, can also be utilized. In still other arrangements, the fasteners are not necessary to secure the flap 50 in place. For instance, the flap 50 can be secured by tucking a portion of the flap 50 between the inverted U-shaped roll 42 and the upper panel 46.

The cushion element 42 is preferably secured to the body portion 44 of the support along the top and side edges of the body portion 44, such as by sewing. The cushion element can alternatively be integrally formed with the body portion 44.

Figure 4:
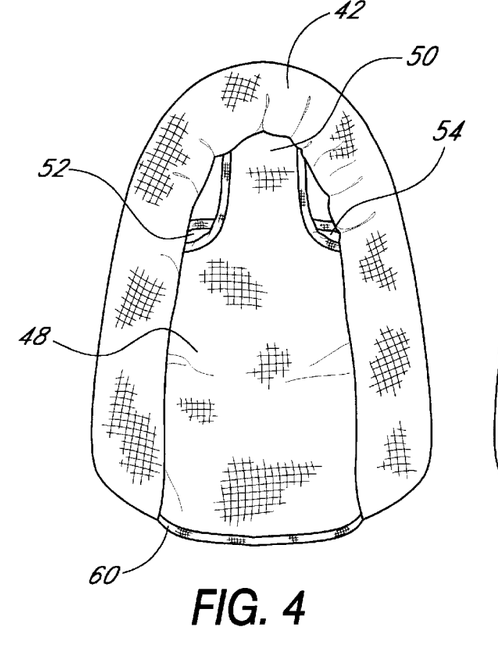
FIG. 4 is a front elevational view of the infant support of FIG. 3, with the flap in a closed position.
Figure 6:
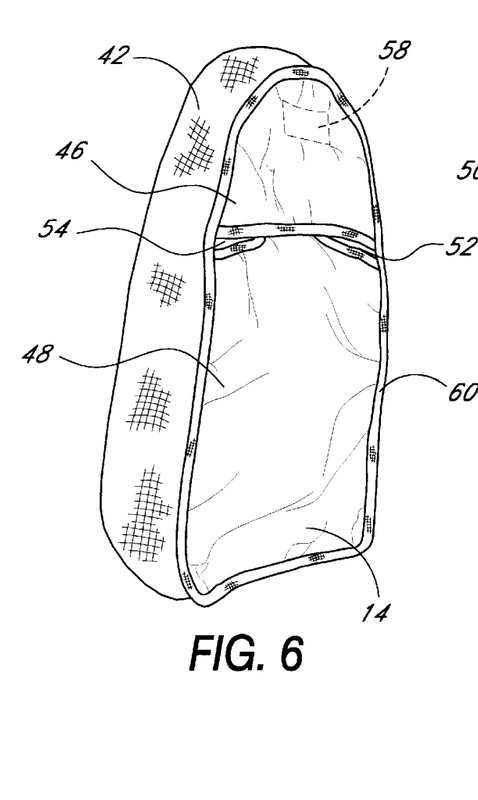
FIG. 6 is a rear, right perspective view of the infant support of FIG. 3, with the flap in a closed position.

As best illustrated in FIGS. 4 and 6, when the flap 50 is coupled to the upper panel 46, two openings 52, 54, one on each side of the body portion 44, are formed. The upper and lower panels 46, 48 can overlap, such that openings 52, 54 are slots, which need not be clearly visible from the frontside.

Figure 5:
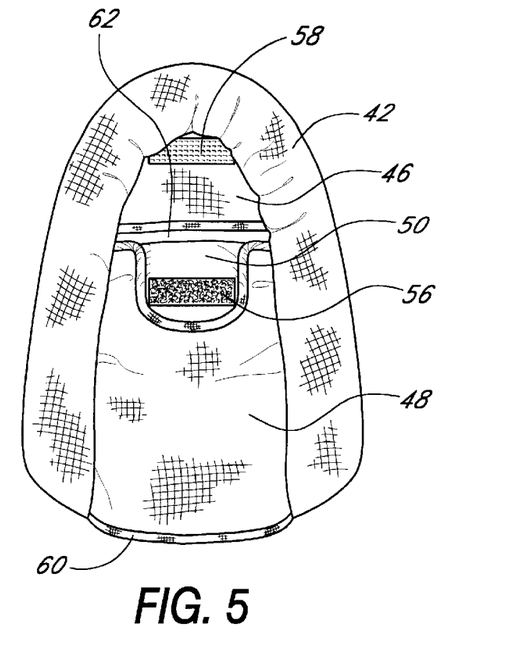
FIG. 5 is a front elevational view of the infant support of FIG. 3, with the flap in an open position.
Figure 7:
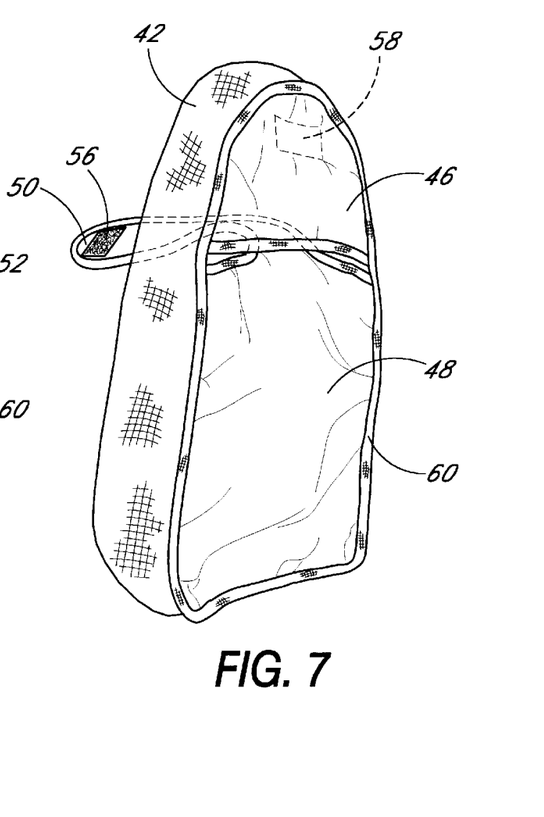
FIG. 7 is a rear, right perspective view of the infant support of FIG. 3, with the flap in an open position.

When the flap 50 is pulled forward or detached from the upper panel 46, as best illustrated in FIGS. 5 and 7, a large, continuous opening 62 is formed between the upper and lower panels 46, 48. The large opening 62 facilitates the insertion of restraining means, such as seatbelts or a shoulder harness, through the support 40, particulary where the harness comprises straps that come together in a V- or Y-configuration.

Figure 8:
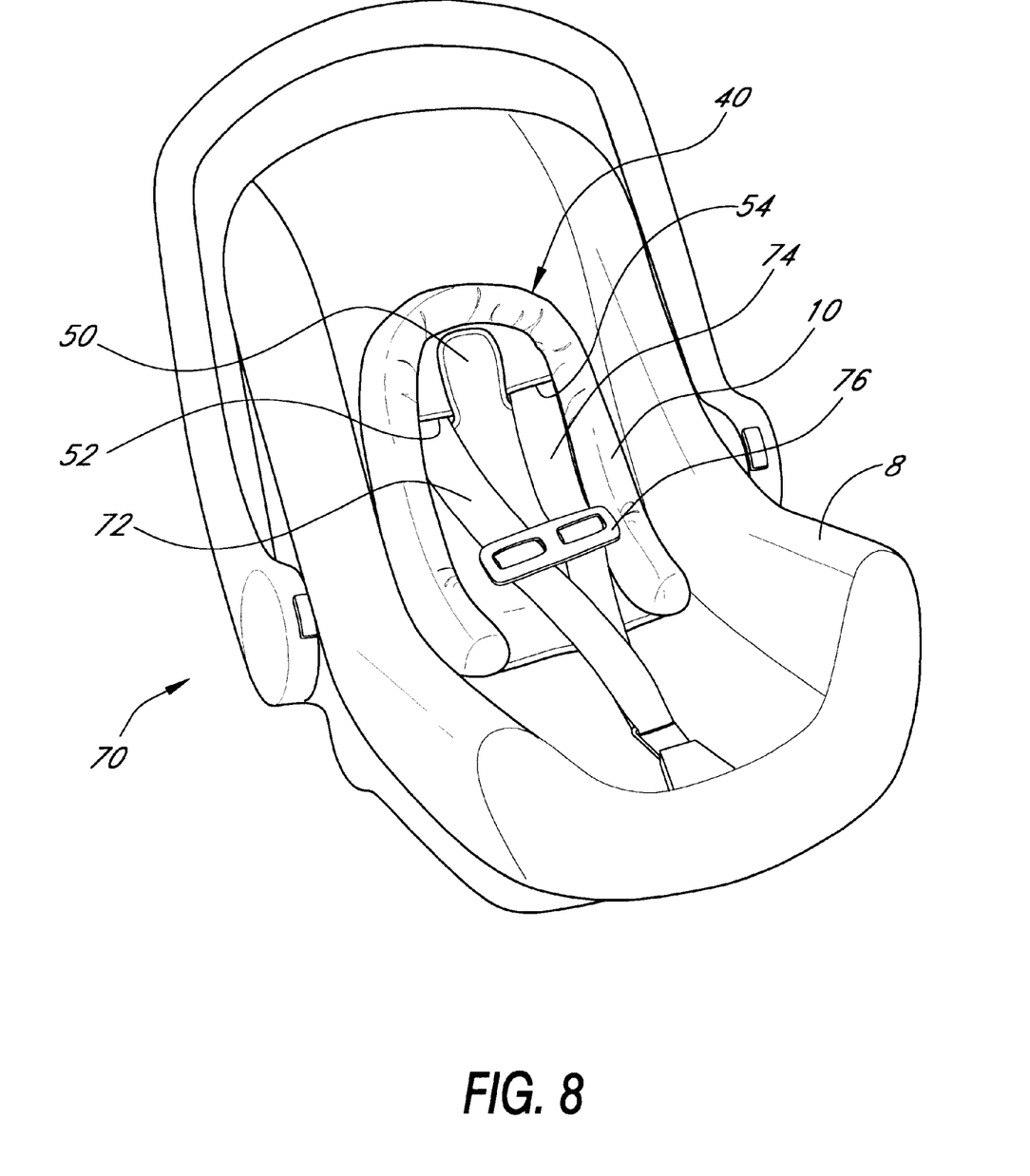
FIG. 8 illustrates the infant support of FIG. 3 positioned within an infant carrier.

FIG. 8 illustrates the support 40 secured within a typical infant carrier 70. Shoulder harness straps 72, 74 of the infant carrier 70 extend through openings 52, 54 of the support 40.

When positioning the support 40 within the infant carrier 70, the flap 50 is detached from the upper panel 46. The shoulder harness straps 72, 74, which are joined in a Y-configuration at a buckle 76, can be simultaneously pulled through the large opening 62. Thus, the shoulder harness straps 72, 74 do not need to be unbuckled from buckle 76 in order to thread the straps through the support 40. The buckle 76 is also pulled through the opening 62. The shoulder harness straps 72, 74 thus do not have to be separated for insertion through the support 40 one at a time.

Figure 9:
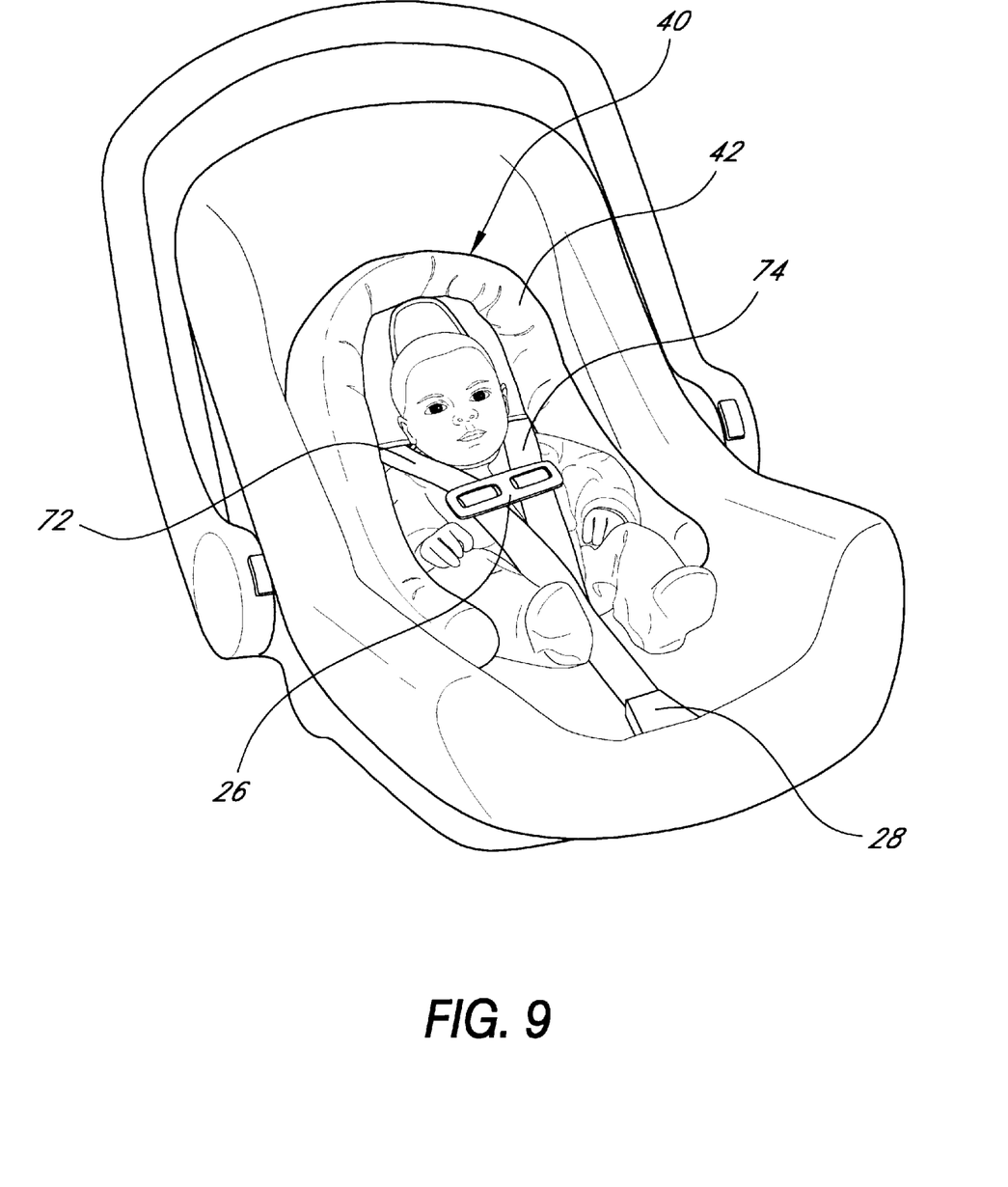
FIG. 9 shows an infant seated in the infant carrier with the infant support of FIG. 8.

After the shoulder harness straps 72, 74 and buckle 76 have been inserted through opening 62, the flap 50 is preferably re-attached to the upper panel 46. As shown in FIG. 9, the flap 50 separates or divides the shoulder harness straps 72, 74 to alleviate chafing and pressure upon the child's neck. The separation of the straps 72, 74 by the flap 50 thus guides the straps over the child's shoulders. Additionally, the overlap of the flap 50 with the upper panel 46 creates extra cushioning just behind the infant's head.

Figure 10:
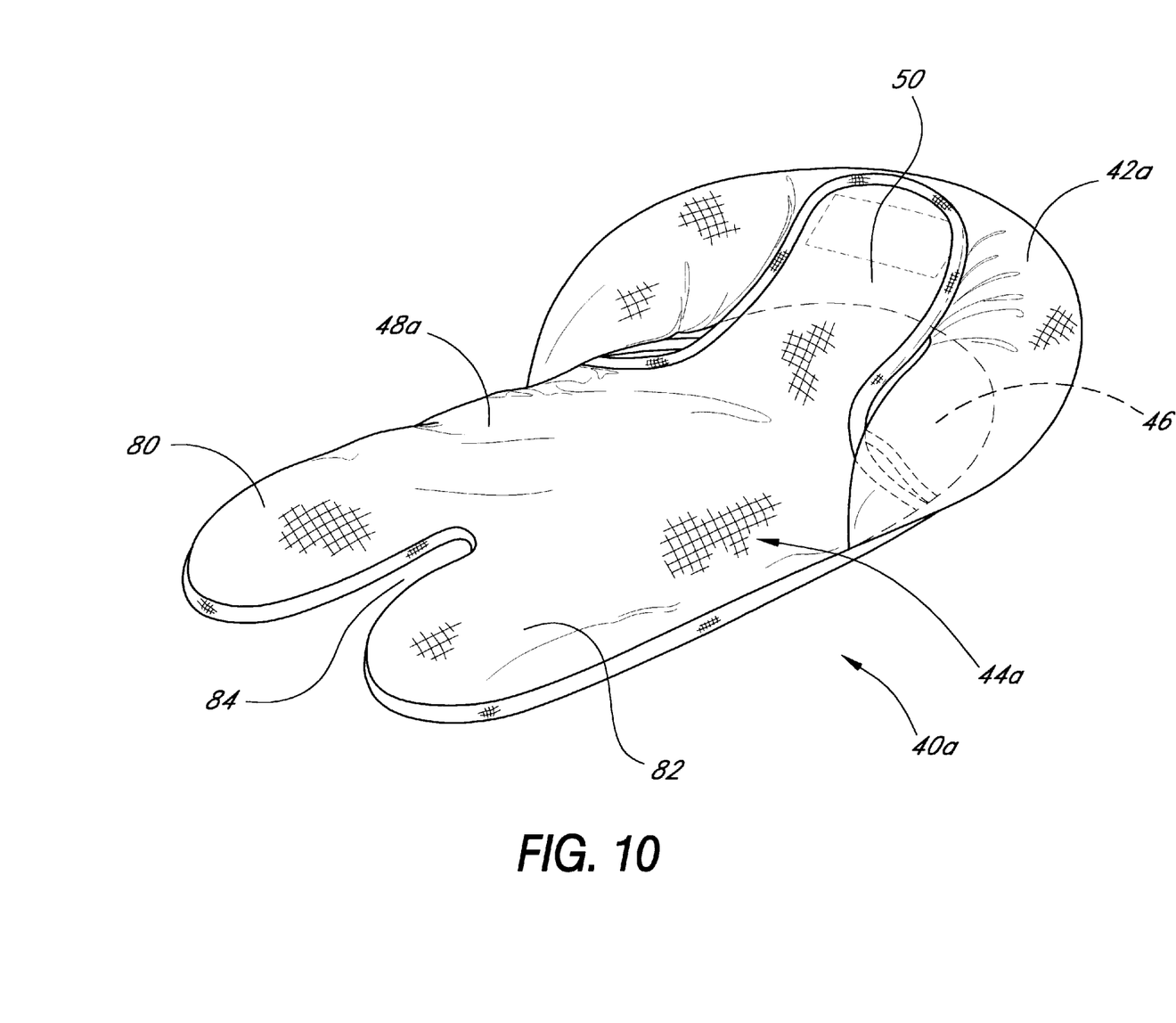
FIG. 10 is a front, right and bottom perspective of an infant or child support in accordance with another preferred embodiment of the present invention.

Referring now to FIG. 10, an infant or child support 40a is illustrated in accordance with the second embodiment of the invention. As with the first embodiment, the illustrated support 40a includes an extension or flap 50 of the lower panel 48a, which flap 50 is releasably connectable with the upper panel 46.

In contrast to the first embodiment, however, the cushion element 42a extends only partially around the body portion 44a of the support 40a. Additionally, in the illustrated embodiment, the lower panel 48a extends into a spaced pair of leg portions 80, 82 having a gap 84 therebetween. The gap 84 provides a central opening through which the crotch portion of a child's seat belt can extend. The support 40a can thus be employed by a larger child, such as a toddler, in conjunction with a carrier or entertainment device (see, e.g., FIG. 8), whereby the cushion 42a functions primarily to support the neck and head of the toddler.

Although the foregoing invention has been described in terms of certain preferred embodiments, other embodiments will become apparent to those of ordinary skill in the art in view of the disclosure herein. Furthermore, the skilled artisan will recognize the interchangeability of various features of one embodiment to another embodiment. Accordingly, the present invention is not intended to be limited by the recitation of preferred embodiments, but is intended to be defined solely by reference to the appended claims.

We claim:

1. A child's head support for use with a child's seating device having a shoulder restraint system including two straps, the support comprising:

a main body portion having an upper panel and a lower panel spaced apart to provide an opening of sufficient size to allow passage therethrough of the assembled shoulder restraint system;

an inverted U-shaped roll made of soft, pliable material extending around at least a portion of the upper panel; and an extension portion extending from one of the upper and lower panels toward the other of the upper and lower panels, the extension portion adapted for being releasably coupled to the other of the upper and lower panels to form one large opening between the upper and lower panels when the extension portion is not coupled to the other of the upper and lower panels when the extension portion is coupled and to form two small spaced-apart openings between the upper and lower panels when the extension portion is coupled for receiving said straps.

2. The head support of claim 1, wherein the extension portion extends from the lower panel and is releasably coupled to the upper panel.

3. The head support of claim 2, additionally comprising a first fastener element on the extension portion and a mating second fastener element on the upper panel.

4. The head support of claim 3, wherein the first fastener element is a hook fastener and the second fastener element is a loop fastener.

5. The head support of claim 2, wherein the extension portion is coupled to the upper panel by inserting a portion of the extension portion between the inverted U-shaped roll and the upper panel.

6. The head support of claim 2, wherein the lower panel includes a pair of spaced leg portions having a gap therebetween.

7. A method of securing an infant head support within an infant carrier having a harness restraint with two straps, the method comprising:

positioning the infant head support generally within the infant carrier, the head support having a body portion and a cushion element extending about a perimeter of the body portion, the body portion including spaced apart first and second panel members with a flap defining a first opening therebetween formed by detaching the flap of the second panel from the first panel;

inserting the harness restraint through said opening between said first and second panels; and re-attaching said flap to said first panel by passing said flap between the straps of said harness restraint to form a pair of second openings enclosing said straps.

8. The method of claim 7, wherein the first panel comprises an upper panel, the second panel comprises a lower panel, and the opening comprises a horizontal slot between the upper and lower panels.

9. The method of claim 7, wherein the straps of the harness restraint are connected at a joint, and inserting the harness restraint through the opening comprises inserting the joint through the opening.

10. The method of claim 9, wherein the joint comprises a double-buckle through which both straps are threaded.

* * * * *